US012120000B1

(12) United States Patent
Smith et al.

(10) Patent No.: US 12,120,000 B1
(45) Date of Patent: Oct. 15, 2024

(54) APPARATUS AND A METHOD FOR THE GENERATION OF DYNAMIC DATA PACKETS

(71) Applicant: The Strategic Coach Inc., Toronto (CA)

(72) Inventors: Barbara Sue Smith, Toronto (CA); Daniel J. Sullivan, Toronto (CA)

(*) Notice: Subject to any disclaimer, the term of this patent is extended or adjusted under 35 U.S.C. 154(b) by 0 days.

(21) Appl. No.: 18/586,977

(22) Filed: Feb. 26, 2024

(51) Int. Cl.
G06F 15/16 (2006.01)
H04L 9/32 (2006.01)
H04L 41/16 (2022.01)

(52) U.S. Cl.
CPC ............... H04L 41/16 (2013.01); H04L 9/32 (2013.01)

(58) Field of Classification Search
None
See application file for complete search history.

(56) References Cited

U.S. PATENT DOCUMENTS

| 10,761,866 | B2 | 9/2020 | Liu | |
|---|---|---|---|---|
| 11,973,784 | B1* | 4/2024 | Erlingsson | H04L 63/1425 |
| 11,995,401 | B1* | 5/2024 | Smith | G06F 40/40 |
| 2011/0258050 | A1 | 10/2011 | Chan | |
| 2014/0304505 | A1* | 10/2014 | Dawson | G06F 21/6227 713/165 |
| 2019/0068526 | A1 | 2/2019 | Xie | |
| 2020/0225655 | A1* | 7/2020 | Cella | G05B 19/41875 |
| 2021/0151056 | A1* | 5/2021 | Trim | H04L 41/16 |
| 2024/0007414 | A1* | 1/2024 | Jain | G06F 9/505 |
| 2024/0048458 | A1* | 2/2024 | Hardy | H04L 41/40 |

* cited by examiner

Primary Examiner — Phuoc H Nguyen
(74) Attorney, Agent, or Firm — Caldwell Intellectual Property Law

(57) ABSTRACT

An apparatus for the generation of dynamic data packets is disclosed. The apparatus includes at least processor and a memory communicatively connected to the processor. The memory instructs the processor to receive a plurality of entity profiles comprising a plurality of attribute data. The processor identifies target data for each entity profile using the attribute data The memory instructs the processor to pair a first entity profile and a second entity profile of the plurality of entity profiles as a function of the assignment. The memory instructs the processor to generate a first dynamic data packet as function of the pairing of the entity profile and the second entity profile. The memory instructs the processor to assign the first dynamic data packet to a first event handler. The memory instructs the processor to display the first dynamic data packet using a dynamic content transmitter on a display device.

20 Claims, 9 Drawing Sheets

APPARATUS AND A METHOD FOR THE GENERATION OF DYNAMIC DATA PACKETS

FIELD OF THE INVENTION

The present invention generally relates to the field of dynamic content generation and transmission. In particular, the present invention is directed to an apparatus and a method for the generation of dynamic data packets.

BACKGROUND

Transmitting dynamic content has long been a cost intensive and time consuming process. The automatic generation and transmission of the dynamic content between multiple parties has also proven to be a difficult task due to a number of variables.

SUMMARY OF THE DISCLOSURE

In an aspect, an apparatus for the generation of dynamic data packets is disclosed. The apparatus includes at least processor and a memory communicatively connected to the processor. The memory instructs the processor to receive a plurality of entity profiles comprising a plurality of attribute data. The memory instructs the processor to identify target data for each entity profile of the plurality of entity profiles as function of the attribute data. The memory instructs the processor to pair a first entity profile and a second entity profile of the plurality of entity profiles as a function of the target data. Pairing the first entity profile and the second entity profile includes iteratively training an entity profile machine-learning model using profile training data, wherein the profile training data comprises the plurality of target data as inputs correlated to examples of pairings of entity profiles and pairing the entity profile and the second entity profile using the trained entity profile machine-learning model. The memory instructs the processor to assign two or more tools to the plurality of entity profiles as a function of the target data. The memory instructs the processor to generate a first dynamic data packet as function of the pairing of the entity profile and the second entity profile. The memory instructs the processor to assign the first dynamic data packet to a first event handler. The memory instructs the processor to display the first dynamic data packet using a dynamic content transmitter on a display device.

In another aspect, a method for the generation of a dynamic content is disclosed. The method includes receiving, using at least a processor, a plurality of entity profiles comprising a plurality of attribute data. The method includes identifying target data for each entity profile of the plurality of entity profiles as function of the attribute data. The method includes pairing, using the at least a processor, a first entity profile and a second entity profile of the plurality of entity profiles as a function of the target data. Pairing the first entity profile and the second entity profile includes iteratively training an entity profile machine-learning model using profile training data, wherein the profile training data comprises the plurality of target data as inputs correlated to examples of pairings of entity profiles and pairing the entity profile and the second entity profile using the trained entity profile machine-learning model. The method includes assigning, using the at least a processor, two or more tools to the plurality of entity profiles as a function of the target data. The method includes generating, using the at least a processor, a first dynamic data packet as function of the pairing of the entity profile and the second entity profile. The method includes assigning, using the at least a processor, the first dynamic data packet to a first event handler. The method includes displaying the first dynamic data packet using a dynamic content transmitter on a display device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for the generation of dynamic data packets is disclosed. The apparatus includes at least processor and a memory communicatively connected to the processor. The memory instructs the processor to receive a plurality of entity profiles comprising a plurality of attribute data. The memory instructs the processor to assign two or more tools to the plurality of entity profiles as a function of the attribute data. The memory instructs the processor to pair a first entity profile and a second entity profile of the plurality of entity profiles as a function of the assignment. Pairing the first entity profile and the second entity profile includes iteratively training a entity profile machine-learning model using profile training data, wherein the profile training data comprises the plurality of attribute data as inputs correlated to examples of pairings of entity profiles and pairing the entity profile and the second entity profile using the trained entity profile machine-learning model. The memory instructs the processor to generate a first dynamic data packet as function of the pairing of the entity profile and the second entity profile. The memory instructs the processor to assign the first dynamic data packet to a first event handler. The memory instructs the processor to display the first dynamic data packet using a dynamic content transmitter on a display device. Exemplary embodiments illustrating aspects of the present disclosure are described below in the context of several specific examples.

Figure 1:
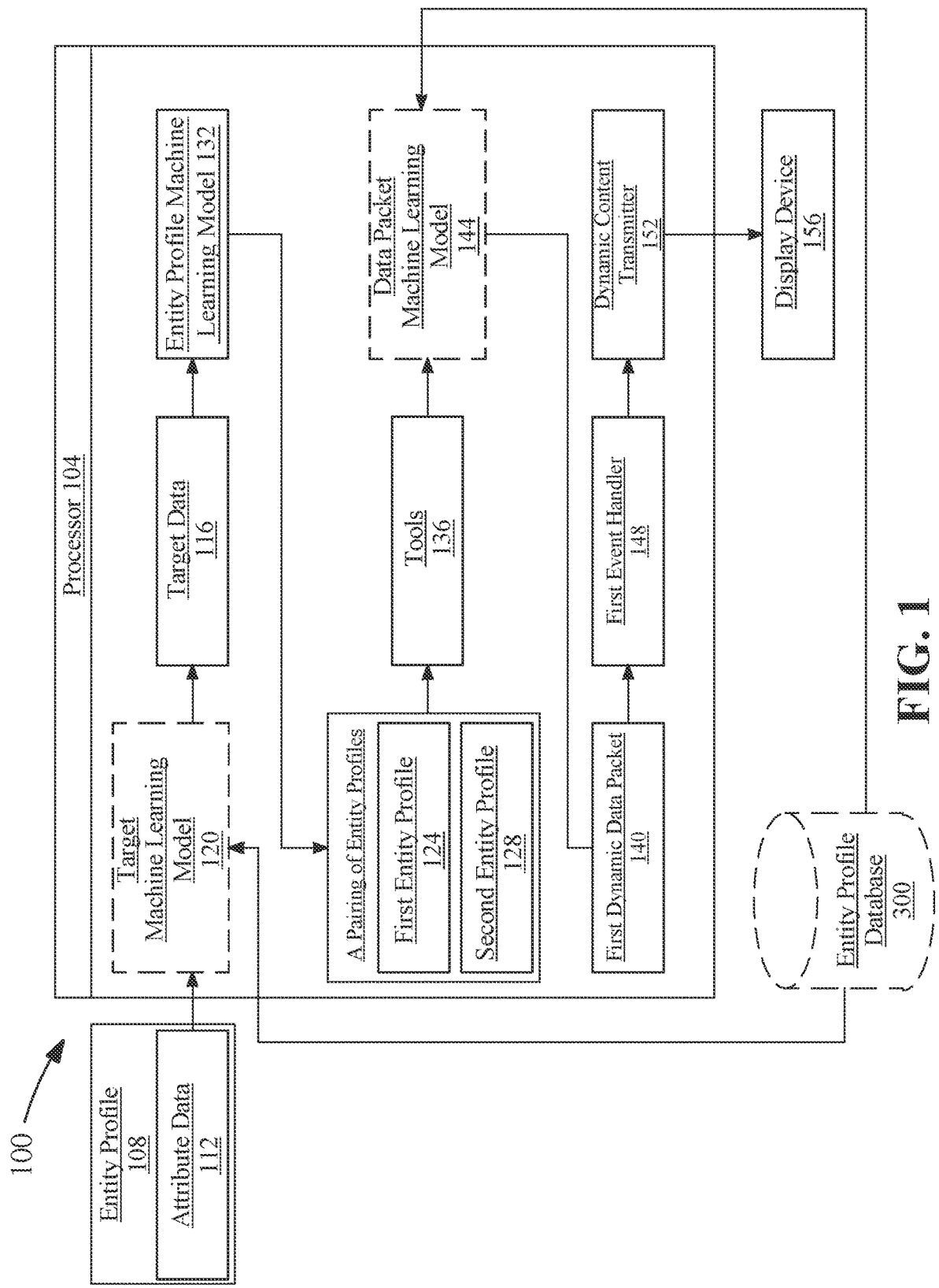
FIG. 1 is a block diagram of an exemplary embodiment of an apparatus for the generation of dynamic data packets.

Referring now to FIG. 1, an exemplary embodiment of an apparatus 100 for the generation of dynamic data packets is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may be configured to receive an entity profile 108 from a user. For the purposes of this disclosure, an "entity profile" is a data structure including data about an entity. An entity profile 108 may be made up of a plurality of entity data. As used in the current disclosure, "entity data" is information associated with an entity. As used in the current disclosure, an "entity" is an organization comprised of one or more persons with a specific purpose. An entity may include a corporation, organization, business, group, and the like. An entity profile 108 may be created by a processor 104, a user, or a third party. As used in the current disclosure, a "user" is an authoritative figure within the entity. The user may include a manager, owner, or shareholder of the entity. The entity profile 108 may include information regarding the products, services, entity's revenue, gross income, net income, business debts, a list of business expenses, current inventory, inventory history, sales information, human resource information, employee information, employee salaries, timecards, a list of company assets, a list of capital projects, accounting information, and the like. Entity data may include information regarding the day-to-day activities of an entity. Entity data may include information about administrative tasks, operations and production, communications and collaborations, sales and marketing, financial management, customer service, human resources, information technology, research and development, and the like.

With continued reference to FIG. 1, an entity profile 108 may include attribute data 112. For the purposes of this disclosure, "attribute data" is data associated with attributes of the entity.

These attributes can encompass a wide range of characteristics or properties that define or describe the entity. As used in the current disclosure, an "attribute" is a characteristic or property that helps describe and define that entity. Attribute data 112 may include specifics associated with the industry in which the entity operates. Examples of this may include healthcare, technology, manufacturing, finance, education, legal, and along with other entrepreneurial endeavors. Attribute data 112 may include specifics associated with the employees of the entity. This may include information associated with the how many employees the entity has. This may also include information associated with regarding the job title, job description, and salary of the entities employees. Attribute data 112 may include information associated with With continued reference to FIG. 1, attribute data 112 may include financial data associated with the entity. As used in the current disclosure, "financial data" refers to the monetary aspects and data related to the entity. Financial data may include information for managing the financial aspects of a business and understanding the economic impact of the products or services in question. Financial data may include information about the initial price of a product or service, any discounts or promotional pricing, and any additional charges such as taxes or shipping fees. Accurate pricing data is essential for revenue calculation. Financial information may include data on the revenue generated from the sale of products. This can be broken down by product, product category, and over specific time periods. Financial data may include information related to cost of goods sold (COGS) as represents the direct costs associated with the production or procurement of the products. It includes expenses like raw materials, labor, and manufacturing costs. Understanding COGS is crucial for calculating gross profit. Financial data may include information about profit margins. Profit margins are calculated by subtracting the COGS from the revenue. This information helps assess the profitability of individual products and the business as a whole. Financial data may also include the valuation of the inventory, which is an asset on the balance sheet. Various methods like FIFO (First-In-First-Out) or LIFO (Last-In-First-Out) may be used to determine the value of inventory. If products are sold on credit, accounts receivable data is important. This represents the money owed to the business by customers who have yet to pay for their purchases. In addition to COGS, financial data may include information related to other operating expenses associated with selling the products, such as marketing, shipping, and overhead costs.

With continued reference to FIG. 1, attribute data 112 may include information related to the entities target group. As used in the current disclosure, a "target group" is the client demographic that the entity targets. A target group may include data regarding the customers of the entity. A target group may identify the customers of the entity based on their characteristics (such as age, location, income, profession, or lifestyle). Customers may include entities and individuals alike. A target group may be identified for each product and/or service an entity offers. A target group may be identified as a function of a the demographics of the consumer. This may be done using historical versions of target groups for products and services that a similar to the current products or services that the entity is trying to promote. In an embodiment, historical versions of target groups may be stored in a database such as database 300. A target group may refer to a specific group of people that a product or service is designed for. The client demographic can be defined by various factors such as age, gender, income level, education, occupation, interests, lifestyle, industry, number of employees, and the like. A target group may be generated by evaluating the characteristics and behaviors of the specific previous clients as detailed in the entity profile 108. In a non-limiting example, if an entity is launching a new line of beauty products, processor 104 may identify a target group as women between the ages of 18-35 who are interested in cosmetics and skincare-Processor 104 may further refine this demographic by identifying additional factors such as income level, geographic location, social media presence, previous purchases, lifestyle, and the like.

With continued reference to FIG. 1, entity profile 108 may be received from a user using a chatbot. A chatbot can be used to receive inputs from a user to generate user data, wherein a chatbot input is discussed in greater detail herein below. The chatbot may be configured to ask a user a plurality of inquiries related to one or more aspects of their business. The chatbot may use natural language processing techniques to understand and extract key information from the user's responses. This may help in determining the specific attributes or characteristics of the entity. Based on the collected data and user inputs, the chatbot may generate a structured user profile 108. Processor 104 may organize the information into different sections or categories based on the nature of the entity. This may be done using a chatbot as described herein below in FIG. 7.

With continued reference to FIG. 1, an entity profile 108 and/or attribute data 112 may be generated from one or more entity records. As used in the current disclosure, an "entity record" is a document that contains information regarding the entity. Entity records may include employee credentials, reports, financial records, medical records, business records, asset inventory, sales history, sales predictions, government records (i.e. birth certificates, social security cards, and the like), and the like. An entity record may additionally include operating records of the entity. Operating records may include things like data associated with the sales of goods and services by the entity. This may include things bills of sale, consumer records, sales projections, and the like. Entity records may be identified using a web crawler. Entity records may include a variety of types of "notes" entered over time by the entity, employees of the entity, support staff, advisors, consultants, tax professionals, financial professionals, and the like. Entity records may be converted into machine-encoded text using an optical character reader (OCR).

Still referring to FIG. 1, in some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted features can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, an entity profile 108 and/or attribute data 112 may be generated using a web crawler. A "web crawler," as used herein, is a program that systematically browses the internet for the purpose of web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to compile the entity profile 108 and/or attribute data 112. The web crawler may be seeded and/or trained with a reputable website, such as the user's business website, to begin the search. A web crawler may be generated by a processor 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract entity records, inventory records, financial records, human resource records, past entity profiles 108, sales records, user notes, and observations, based on criteria such as a time, location, and the like. In some cases, a web crawler may be seeded with the website to the entities website. The process of seeding a web crawler refers to the process of providing an initial set of URLs or starting points from which the crawler begins its exploration of the web. These initial URLs are often called seed URLs or a seed set. Seeding may be a curtail step in the web crawling process as it defines the starting point for discovering and indexing web pages.

With continued reference to FIG. 1, processor 104 may be configured to identify target data 116 associated with each entity profile 108. As used in the current disclosure, a "target data" refers to specific objectives or targets that an individual, organization, or entity aims to achieve. These goals are typically based on measurable and quantifiable outcomes that are intended to guide efforts and measure success. Target data 116 is an essential component of planning, performance evaluation, and decision-making in various contexts, including personal development, business, project management, and more. Target data 116 related to goals often includes details such as the goal itself, the desired outcome, the timeline for achievement, and the criteria for measuring progress and success. Target data 116 provides a framework for tracking and assessing performance, enabling individuals and organizations to work toward desired results and make informed decisions to reach those results. The target data 116 may be defined based on the attribute data 112. These objectives are typically designed to leverage the entity's attributes to achieve desired outcomes. Goals can be diverse, such as increasing market share, improving customer satisfaction, optimizing pricing strategies, or expanding into new markets. In an embodiment, target data 116 may include goals that are quantifiable and made measurable. For example, a goal quantifiable goal might be expressed as "increase market share in the 18-34 age group by 10% in the next quarter" or "reduce manufacturing costs by 15% within the year." The target data 116 of each entity may be configured to be aligned with the attributes the entity as reflected by attribute data 112. In some cases, target data 116 may include the identification of one or more performance metrics. As used in the current disclosure, a "performance metric" is a quantifiable measure or indicator used to assess the effectiveness, efficiency, or success of a particular process, project, system, or individual performance. These metrics are crucial for evaluating and tracking progress, making informed decisions, and identifying areas for improvement. Many performance metrics include a time component, such as being measured daily, weekly, monthly, or annually, depending on the context. The time frame is essential for tracking progress and setting expectations. Performance metrics may include a defined assessment of progress toward each goal. These metrics help in tracking and evaluating the success of goal attainment. For instance, if the goal is to expand into a new market segment, metrics may include revenue growth, customer acquisition, and market penetration rate. Based on the analysis of attribute data and performance metrics, the entity may need to adapt its strategies and operations to align with its goals. This might involve product development, marketing campaigns, customer outreach, or other actions aimed at goal achievement. In an embodiment, target data 116 may be generated using a look-up table and/or target machine learning model.

With continued reference to FIG. 1, a processor 104 may identify target data 116 using a lookup table. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in a static program storage, calculated as part of a program's initialization phase or even stored in hardware in application-specific platforms. Data within the lookup table may include previous examples of target data 116 compared to attribute data 112. Data within the lookup table may be received from database 300. Lookup tables may also be used to identify target data 116 by matching an input value to an output value by matching the input against a list of valid (or invalid) items in an array. In a non-limiting example, attribute data 112 may reflect that the entity has 5 employees who complete various tasks throughout the week. Examples of target data 116 may include production goals for the company based on the employees work product. A lookup table may look up the entity's attribute data 112 as an input and output target data 116. Processor 104 may be configured to "lookup" or input one or more entity profiles 108, attribute data 112, and the like. Whereas the output of the lookup table may comprise target data 116. Data from the lookup table may be compared to examples of target data 116, for instance, and without limitation using string comparisons, numerical comparisons such as subtraction operations, or the like. Alternatively or additionally, a query representing elements of attribute data 112 may be submitted to the lookup table and/or a database.

With continued reference to FIG. 1, processor 104 may generate target data 116 using a target machine-learning model 120. As used in the current disclosure, a "target machine-learning model" is a machine-learning model that is configured to generate target data 116. Target machine-learning model 120 may be consistent with the machine-learning model described below in FIG. 2. Inputs to the target machine-learning model 120 may include entity profile 108, attribute data 112, target group, financial data, examples of target data 116, and the like. Outputs to the target machine-learning model 120 may include target data 116 tailored to the attribute data 112. Target training data may include a plurality of data entries containing a plurality of inputs that are correlated to a plurality of outputs for training a processor by a machine-learning process. In an embodiment, target training data may include a plurality of attribute data 112 correlated to examples of target data 116. Target training data may be received from database 300. target training data may contain information about entity profile 108, attribute data 112, target group, financial data, examples of target data 116, and the like. In an embodiment, target training data may be iteratively updated as a function of the input and output results of past target machine-learning model 120 or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, processor 104 may pair a first entity profile 124 and a second entity profile 128 of the plurality of entity profiles 108 as a function of the target data 116. The pairing may be established for collaboration, cooperation, or mutual benefit with the goal of progressing the entity towards the goal set by the target data 116. The reasons for pairing profiles could vary and depend on the target data 116 of the entity. Pairing two entity profiles might mean that these entities are expected to work together or collaborate to achieve goals included within target data 116. The pairing could indicate that these entities are encouraged to share specific resources or information. For example, they might have access to each other's data, tools, or assets. In some cases, a more experienced entities may be paired with a less experienced one to provide mentorship or coaching. The tools may be assigned to the mentor or coach that can assist in guiding the other entity. Apparatus 100 may pair two or more entity profiles with a goal of helping the entities build professional networks or connections to facilitate the achievement of their goals as defined by the target data 116. In an embodiment, pairs may be formed to encourage mutually beneficial interactions. The pairing may help both entities achieve their individual goals while benefiting from each other's expertise or resources. In certain contexts, entity profiles 108 may be paired to form teams specifically designed to tackle particular problems or challenges. The assigned tools can support their problem-solving efforts.

With continued reference to FIG. 1, processor 104 may pair a first entity profile 124 and a second entity profile 128 based on a resource collaboration criteria. As used in the current disclosure, a "resource collaboration criteria" are specific rules, conditions, or factors used to determine whether a collaboration between two or more parties is likely to be productive and mutually beneficial, particularly in the context of resource sharing and utilization. These criteria are essential for evaluating the compatibility and potential success of collaborations. Collaboration criteria may consider whether the parties involved have complementary skills and expertise. Collaborators with different but complementary skills may work together more effectively. Processor 104 may assess whether the resources possessed by the collaborating parties complement each other. This can include financial resources, physical assets, technology, personnel, equipment, intellectual property, and the like. In some embodiment, processor 104 may determine the level of resource allocation and commitment that each party is willing to contribute to the collaboration. This includes financial investments, personnel allocation, time commitment, resource commitment, and the like.

With continued reference to FIG. 1, processor 104 may pair a first entity profile 124 and a second entity profile 128 based on a mentorship collaboration criteria. As used in the current disclosure, a "mentorship collaboration criteria" are specific guidelines, conditions, and factors used to determine whether a mentorship relationship between the two parties is likely to be successful and beneficial. Mentorship collaborations may be designed to help individuals gain knowledge, guidance, and support from more experienced individuals or mentors. The criteria ensure that the mentorship is structured and productive. The mentorship collaboration criteria may assess whether the mentor (first entity profile 124) possesses the necessary knowledge, skills, and expertise in areas that are relevant to the mentee (second entity profile 128). The mentor should have experience that aligns with the goals of the mentee. Processor 104 may determine the skills of the first entity profile by analyzing the mentor's educational background, degrees, and certifications to identify relevant qualifications. This may include examining the mentor's professional experience, including job roles, industry knowledge, and work history. The processor 104 may additionally evaluate the mentor's resume or curriculum vitae to identify specific skills and achievements. This information may be extracted from the entity profile 108. In some cases, processor 104 may estimate the skills' of the mentor based on their track record of historical goal completion. This may be extracted from historical versions of target data. In some embodiments, processor may extract skill from the user's attribute data 112 using Natural Language Processing (NLP) techniques. Extracting skills from attribute data using Natural Language Processing (NLP) involves the application of advanced language modeling and text analysis techniques to identify and categorize specific skills and competencies mentioned in unstructured text. NLP models can process large datasets of job descriptions, resumes, or other textual sources, recognizing keywords, phrases, and contextual information related to skills. In an embodiment, when evaluating whether the mentor and mentee share common goals and objectives for the mentorship. A clear alignment in goals helps guide the mentorship relationship effectively. In an embodiment, if entity user profile is assigned a goal setting tool the first entity profile 124 and the second entity profile 128 may be paired based one the mentorship collaboration criteria. Additionally, the first entity profile 124 and the second entity profile 128 may be matched based on their common goals or previously achieved goals. In a non-limiting examples, if a first entity profile 124 achieved a goal set by the goal setting tool, the first entity profile 124 may be eligible to mentor second entity profile 128 based on the current goal set by the second entity profile.

With continued reference to FIG. 1, processor 104 may pair two or more entity profiles 108 using an entity profile machine-learning model 132. As used in the current disclosure, an "entity profile machine-learning model" is a machine-learning model that is configured to pair a first entity profile 124 and a second entity profile 128. An entity profile machine-learning model 132 may be consistent with the machine-learning model described below in FIG. 2. Inputs to the entity profile machine-learning model 132 may include entity profiles 108, mentorship collaboration criteria, resource collaboration criteria, attribute data 112, target group, financial data, target data 116, examples of a pair of entity profiles, and the like. Outputs to the entity profile machine-learning model 132 may include a pairing of a first entity profile 124 and a second entity profile 128 tailored to the target data 116. Entity profile training data may include a plurality of data entries containing a plurality of inputs that are correlated to a plurality of outputs for training a processor by a machine-learning process. In an embodiment, entity profile training data may include target data correlated to examples of pairings of a first entity profile and a second entity profile. In an embodiment, entity profile training data may include target data and entity profiles correlated to examples of pairings of a first entity profile and second entity profile. Entity profile training data may be received from database 300. Entity profile training data may contain information about entity profiles 108, mentorship collaboration criteria, resource collaboration criteria, attribute data 112, target group, financial data, target data 116, assignments of two or more tools 136, examples of a pair of entity profiles, and the like. In an embodiment, entity profile training data may be iteratively updated as a function of the input and output results of past entity profile machine-learning models 132 or any other machine-learning model mentioned throughout this disclosure. The classifier may use, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifier, and the like.

With continued reference to FIG. 1, machine learning plays a crucial role in enhancing the function of software for generating an entity profile machine-learning model 132. This may include identifying patterns of within the target data 116 that lead to changes in the capabilities of the entity profile machine-learning model 132. By analyzing vast amounts of data related to the target data 116 to each of the first entity profile 124 and the second entity profile 128, machine learning algorithms can identify patterns, correlations, and dependencies that contribute to a generating the entity profile machine-learning model 132. These algorithms can extract valuable insights from various sources, including evaluations of the needs of each of the first entity profile 124 and the second entity profile 128 based on the target data 116. By applying machine learning techniques, the software can generate the entity profile machine-learning model 132 extremely accurately. Machine learning models may enable the software to learn from past iterations of entity profile machine-learning model 132 and iteratively improve its training data over time.

With continued reference to FIG. 1, processor 104 may be configured to update the training data of the entity profile machine-learning model 132 using user inputs. An entity profile machine-learning model 132 may use a user input to update its training data, thereby improving its performance and accuracy. In embodiments, the entity profile machine-learning model 132 may be iteratively updated using input and output results of past iterations of the entity profile machine-learning model 132. The entity profile machine-learning model 132 may then be iteratively retrained using the updated entity profile training data. For instance, and without limitation, entity profile machine-learning model 132 may be trained using a first training data from, for example, and without limitation, a user input or database. The entity profile machine-learning model 132 may then be updated by using previous inputs and outputs from the entity profile machine-learning model 132 as second training data to then train a second machine learning model. This process of updating the entity profile machine-learning model 132 and its associated training data may be continuously done to create subsequent entity profile machine-learning models 132 to improve the speed and accuracy of the newer entity profile machine-learning model 132. When users interact with the software, their actions, preferences, and feedback provide valuable information that can be used to refine and enhance the model. This user input is collected and incorporated into the training data, allowing the machine learning model to learn from real-world interactions and adapt its predictions accordingly. By continually incorporating user input, the model becomes more responsive to user needs and preferences, capturing evolving trends and patterns. This iterative process of updating the training data with user input enables the machine learning model to deliver more personalized and relevant results, ultimately enhancing the overall user experience. The discussion within this paragraph may apply to both the entity profile machine-learning model 132 and any other machine-learning model/classifier discussed herein.

Incorporating the user feedback may include updating the training data by removing or adding correlations of user data to a path or resources as indicated by the feedback. Any machine-learning model as described herein may have the training data updated based on such feedback or data gathered using a web crawler as described above. For example, correlations in training data may be based on outdated information wherein, a web crawler may update such correlations based on more recent resources and information.

With continued reference to FIG. 1, processor 104 may use user feedback to train the machine-learning models and/or classifiers described above. For example, machine-learning models and/or classifiers may be trained using past inputs and outputs of entity profile machine-learning model 132. In some embodiments, if user feedback indicates that an output of machine-learning models and/or classifiers was "bad," then that output and the corresponding input may be removed from training data used to train machine-learning models and/or classifiers, and/or may be replaced with a value entered by, e.g., another value that represents an ideal output given the input the machine learning model originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for the machine-learning model and/or classifier using user feedback. For the purposes of this disclosure, "accuracy score," is a numerical value concerning the accuracy of a machine-learning model. For example, the accuracy/quality of the outputted entity profile machine-learning model 132 may be averaged to determine an accuracy score. In some embodiments, an accuracy score may be determined for pairing of entities. Accuracy score or another score as described above may indicate a degree of retraining needed for a machine-learning model and/or classifier. Processor 104 may perform a larger number of retraining cycles for a higher number (or lower number, depending on a numerical interpretation used), and/or may collect more training data for such retraining. The discussion within this paragraph and the paragraphs preceding this paragraph may apply to both the entity profile machine-learning model 132 and/or any other machine-learning model/classifier mentioned herein.

With continued reference to FIG. 1, processor 104 may assign two or more tools 136 to the first entity profile 124 and the second entity profile 128 as a function of the target data 116. As used in the current disclosure, a "tool" is a software designed to provide guidance, support, and assistance to the entity. These tools 136 may be assigned to each entity profile with the goal of progressing the entities towards their goal as defined by the target data 116. These tools 136 may aim to facilitate various aspects of entrepreneurship, helping entrepreneurs navigate the challenges and complexities of starting, managing, and growing a business. These tools 136 may be software applications or programs that run on electronic devices like computers, tablets, wearable devices, laptops, mobile devices, smart phones, and the like. These tools 136 may offer guidance to entrepreneurs by providing information, advice, and recommendations. They may include features like tutorials, tips, best practices, and resources to help entrepreneurs make informed decisions. In some cases, the tools 136 may offer guidance to entrepreneurs by providing information, advice, and recommendations. They may include features like tutorials, tips, best practices, and resources to help entrepreneurs make informed decisions. They leverage technology to provide their intended services. In a non-limiting example, these tools may include organizational tool, motivational tools, time management tools, productivity tools, risk management tools, market share tools, employee management tools, goal setting tools, long-term goal setting tools, and the like.

With continued reference to FIG. 1, processor 104 may assign two or more tools 136 to the plurality of entity profiles 108 as a function of the attribute data 112. Assigning a tool 136 to an entity profile 108 based on attribute data is a process that may be facilitated by computer algorithms and software. This process involves several steps, including data analysis, decision-making, and user interaction. In an embodiment, processor 104 may employ an algorithm designed to recommend tools based on the analyzed attribute data 112. This algorithm takes into account multiple aspects the entity's characteristics, needs, and goals. The processor 104 may assign two or more tools 136 to the plurality of entity profiles 108 based upon the current needs of the entity. For example, if an entity's financial data is negatively trending the processor 104 may assign an entity profile a financial management tool and a resource management tool. The processor 104 may compares the user's attribute data 112 with the features and capabilities of available tools 136. This comparison aims to identify tools 136 that align with the entity profile 108 and requirements. In some cases, the processor 104 may assign scores or ranks to the tools based on how well they match the entities attribute data 112. Tools 136 that closely align with the user's needs may receive higher scores. The processor 104 may then recommend two or more tools to the entity profile 108 based on the scores or rankings. It may present these recommendations to the user through a user interface, such as a website, app, or notification. The processor 104 can gather feedback from entities about their experiences with the recommended tools 136. This feedback is valuable for ongoing refinement of the apparatus 100. Over time, the recommendation system becomes more accurate and tailored to the user's changing needs and preferences. The system adapts to evolving user attributes.

With continued reference to FIG. 1, tools 136 may include a time management tool. As used in the current disclosure, a "time management tool" is a software application or system designed to help individuals or organizations effectively plan, organize, track, and optimize their use of time. These tools 136 are essential for improving productivity, managing tasks, and ensuring that time is allocated efficiently to achieve specific goals. Time management tools may allow users to create, organize, and track tasks, activities, and projects. Users can categorize tasks, set deadlines, and prioritize them based on importance and urgency. A time management tools may include to-do lists where users can list and manage tasks they need to complete. These lists can be organized by date, priority, or project. Time management tools may allow users to set long-term and short-term goals. Users can track their progress and align their daily activities with their goals. Many time management tools support collaboration among team members. Users can share calendars, tasks, and project details with colleagues, making it easier to coordinate work.

With continued reference to FIG. 1, tools 136 may include a resource management tool. As used in the current disclosure, a "resource management tool" is a software application or system designed to help organizations efficiently plan, allocate, monitor, and optimize their resources. Resources in this context can include human resources (employees), equipment, materials, and financial assets. These tools are essential for improving resource allocation, maximizing utilization, and ensuring that projects and operations run smoothly. Resource management tools may enable organizations to allocate their resources, both human and non-human, to projects, tasks, or activities. They help in identifying the right resource for the right job. Resource management tools can track the availability and utilization of resources in real-time. This allows for better decision-making and preventing over allocation or underutilization of resources. Resource management tools may assist in long-term planning by helping organizations understand their resource capacity and needs. This enables better resource allocation for future projects. In some cases, resource management tools may integrate with project management software to facilitate resource allocation within projects. This ensures that project tasks are adequately staffed. Some resource management tools include collaboration features to help teams communicate and coordinate their resource needs and availability.

With continued reference to FIG. 1, tools 136 may include a goal setting tool. As used in the current disclosure, a "goal setting tool" is a software application or platform that is designed to help individuals and organizations set, track, and achieve their goals. These tools 136 may provide a structured approach to defining objectives, creating action plans, monitoring progress, and staying motivated. They are widely used for personal development, project management, and business planning. Goal setting tools may be used to create and define specific, measurable, achievable, relevant, and time-bound (SMART) goals. The tool encourages clear goal setting to increase the likelihood of success. Goal setting tools may be categorized into different areas of life or business, such as personal, professional, financial, health, or education, making it easier to manage multiple objectives. In an embodiment, these tools may help entities break down their goals into actionable tasks and steps. Users can create to-do lists and timelines to achieve their goals. In some embodiments, the entity can monitor their progress in real-time using goal setting tools. Progress bars, charts, and graphs may be used to visualize goal achievement and track milestones. Goal setting tools can create goals that range from long-term (e.g., 5-year career plan) to short-term (e.g., daily to-do lists), allowing for flexibility in goal setting.

With continued reference to FIG. 1, processor 104 may assign two or more tools 136 to an entity profile 108 using an assignment classifier. As used in the current disclosure, an "assignment classifier" is a classifier that is configured to assign two or more tools 136 to an entity profile 108. An assignment classifier may be consistent with the classifier described below in FIG. 2. Inputs to the assignment classifier may include entity profile 108, attribute data 112, target group, financial data, tools 136, examples of assignments of two or more tools 136, and the like. Outputs to the assignment classifier may include the assignment two or more tools 136 tailored to the entity's attribute data 112. Assignment training data may include a plurality of data entries containing a plurality of inputs that are correlated to a plurality of outputs for training a processor by a machine-learning process. In an embodiment, assignment training data may include a plurality of attribute data 112 correlated to examples of an assignment of two or more tools 116. Assignment training data may be received from database 300. Assignment training data may contain information about entity profile 108, attribute data 112, target group, financial data, tools 136, examples of assignments of two or more tools 136, and the like. In an embodiment, assignment training data may be iteratively updated as a function of the input and output results of past assignment classifier or any other classifier mentioned throughout this disclosure. The classifier may use, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifier, and the like.

With continued reference to FIG. 1, processor 104 may be configured to generate a first dynamic data packet 140 as function of the pairing of the first entity profile 124 and the second entity profile 128. As used in the current disclosure, a "dynamic data packet" refers to a unit of data that is configured to change or be updated during its journey through a network. Unlike a static data packet, which carries fixed or unchanging data, a dynamic data packet 140 may carry variable or real-time information. Dynamic data packets 140 are commonly used in applications that require real-time communication and where data is frequently updated. Dynamic data packets 140 may contain data that can change, often in real-time. This dynamic content might include sensor data, live video streams, audio, or other information that updates continuously or at specific intervals. In an embodiment, Dynamic data packets may include timestamps to indicate when the data was generated or last updated. This is crucial for tracking the freshness of the information. A first dynamic data packet 140 may be used in real-time applications, such as video conferencing, online gaming, live streaming, and remote monitoring. In these applications, the data within the packet needs to be as up-to-date as possible. Dynamic data packets 140 may be designed to be efficient in terms of data transmission. They may use compression or other techniques to reduce the amount of data sent over the network, especially when updates are frequent. In some cases, the dynamic data packet 140 may include links to media files, such as images and videos, are included in the packet. These links allow the user's device to retrieve and display the media content. Dynamic data packets may be sent over a communication channel, which could be a wired or wireless network, using a suitable data transmission protocol. In some cases, error correction and compression techniques may be applied to optimize data transfer. The recipient or receiver of the data packets listens for incoming packets. As packets arrive, they are processed to extract the data and any associated metadata. The receiver also keeps track of the order of the packets, ensuring that the data is reconstructed correctly. To account for potential delays, packet loss, or out-of-order packet arrival, data may be buffered at the receiver. A buffer holds recently received packets until they can be processed and presented in the correct order. The data may be continuously updated as new packets arrive. The receiver may display or process the data in real-time or store it for later analysis, depending on the application.

With continued reference to FIG. 1, a first dynamic data packet 140 may include a timeline data packet. As used in the current disclosure, "timeline data packet" is a specialized unit of data designed to facilitate a real time social media style newsfeed. In an embodiment, content that included within the newsfeed and/or timeline may be derived from the plurality of entity profiles 108. This timeline data packet is continuously updated and presents a record of posts, interactions, and events that are relevant to the user. In an embodiment, timeline data packet may be organized in chronological order, with the most recent content and activities displayed at the top or the beginning of the timeline. Users scroll through their timeline to view older content. Timeline data packet may contain a plurality of information associated with the plurality of entity profiles 108, specifically this may include information associated with the first entity profile 124 and the second entity profile 128. In an embodiment, timeline data packet may include images, text, video, messages, and the like that are associated with an entity profile. In an embodiment, timeline data packet may include posts or updates from the user and the user's connections (i.e. additional entity profiles) are the primary components of timeline data packet. These posts may include text, images, videos, web links, audio, and other multimedia content. In addition to content posts, timeline data packet includes user activities such as liking, sharing, commenting, and reacting to posts. These interactions may be displayed alongside the relevant posts. Some timeline data packet may include engagement metrics, such as the number of likes, reactions, comments, and shares a post has received. These metrics provide social proof and indicate the popularity of content.

With continued reference to FIG. 1, a dynamic data packet may include a real-time video communication packet. As used in the current disclosure, a "real-time video communication packet" is a specialized unit of data designed to facilitate live video communication between participants in a video chat or video conference. A real-time video communication packet may be essential for ensuring that video and audio data are transmitted seamlessly, in real-time, and with minimal latency. The packet contains the video and audio data captured by the user's camera and microphone. This includes real-time video frames and audio samples that are being captured during the video chat. Information about the video and audio codecs used for encoding and compressing the data. Codecs help reduce data size for efficient transmission. In some embodiments, Each video frame and audio sample may be timestamped to ensure synchronization between the sender and receiver. Timestamps help ensure that video and audio remain in sync during playback. In some cases, the real-time video communication packet may include information about the sender, such as their username, profile picture, and a unique identifier (i.e. Telephone number, Entity Name, User Name, and the like). This allows the recipient to identify the source of the video and audio data. In some embodiments, information about network conditions, including data transfer rates, packet loss, and latency, may be included within the real-time video communication packet to help optimize video and audio quality based on the current network situation. In some cases, mechanisms for error correction and handling of lost packets may be include into the real-time video communication packet to ensure that video and audio data is reconstructed accurately at the recipient's end. The packet may include Elements for user interface interactions, such as the display of participant thumbnails, mute/unmute buttons, and the ability to switch between video streams.

With continued reference to FIG. 1, dynamic data packet may include a real-time collaboration data packet. As used in the current disclosure, a "real-time collaboration data packet" for collaborative tools is a specialized unit of data designed to support real-time collaboration between multiple users in online whiteboards, document sharing platforms, and similar collaborative environments. These packets enable users to work together on shared documents, projects, or creative endeavors by synchronizing their interactions in real time. The real-time collaboration data packet may contain the content of the document that first entity profile 124 and the second entity profile 128 are collaborating on. This may include text, drawings, diagrams, images, shapes, or any other elements relevant to the document's purpose. In an embodiment, a real-time collaboration data packet may include information about the actions and interactions performed by the users. This can encompass actions such as drawing, typing, moving objects, resizing, highlighting, and other edits made to the document. The real-time collaboration data packet may include information about the tools and functions used by users, such as drawing tools, text editors, color choices, and other collaborative feature. The packet facilitates real-time updates, ensuring that any action performed by one user is immediately visible to all others collaborating on the document. The packet may additionally include information about actions that involve multiple users collaborating simultaneously, such as co-editing, group drawing, or shared interactions. In embodiment, processor 104 may include within the real-time collaboration data packet mechanisms for ensuring that all users see the same document content and are working on the same version of the document.

With continued reference to FIG. 1, dynamic data packet may include a real-time text-based communication packet. As used in the current disclosure, a "real-time text-based communication packet" is a dynamic data packet that is configured to facilitate real-time text-based communication among multiple users in an online chat environment. The dynamic data packets enable real-time updates, ensuring that messages and interactions are visible to all chatroom participants as they occur. These packets enable users to exchange messages, interact with one another, and participate in discussions within a chatroom. In an embodiment, the packet may contain the text content of the messages exchanged by users. Messages can include text, emojis, links, documents, photos, and other textual elements. In some cases, each message may include user identifiers, typically in the form of usernames or avatars, to indicate the sender of the message. This allows chatroom participants to see who is sending each message. Every message within the packet may be timestamped to indicate when it was sent. Timestamps provide context regarding the timing of each message. The packet may include information about the message format, such as font style, text color, and other formatting options, may be included to support user customization. In some embodiments, the packet can include information about the status of messages, indicating whether a message has been read, delivered, or is pending. This may help users track the progress of their messages. In some cases, Actions taken by users within the chatroom, such as sending messages, joining, or leaving the chatroom, and initiating private conversations, are included in the packet.

With continued reference to FIG. 1, processor 104 may generate a first dynamic data packet 140 using a data packet machine-learning model 144. As used in the current disclosure, a "data packet machine-learning model" is a machine-learning model that is configured to generate a first dynamic data packet 140. Data packet machine-learning model 144 may be consistent with the machine-learning model described below in FIG. 2. Inputs to the data packet machine-learning model 144 may include entity profiles 108, mentorship collaboration criteria, resource collaboration criteria, attribute data 112, target group, financial data, tools 136, assignments of two or more tools 136, pairing of entity profiles, examples of dynamic data packets, and the like. Outputs to the data packet machine-learning model 144 may include first dynamic data packet 140 tailored to the pairing of the first entity profile 124 and the second entity profile 128. Data packet training data may include a plurality of data entries containing a plurality of inputs that are correlated to a plurality of outputs for training a processor by a machine-learning process. In an embodiment, data packet training data may include a plurality of pairing of the first entity profile 124 and the second entity profile 128 correlated to examples of first dynamic data packet 140. Data packet training data may be received from database 300. Data packet training data may contain information about entity profiles 108, mentorship collaboration criteria, resource collaboration criteria, attribute data 112, target group, financial data, tools 136, assignments of two or more tools 136, pairing of entity profiles, examples of dynamic data packets, and the like. In an embodiment, data packet training data may be iteratively updated as a function of the input and output results of past data packet machine-learning model 144 or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, a chatroom may be created between the first entity profile and the second entity profile using the real-time text based communication packet. A chatroom facilitated by a real-time text-based communication packet is a dynamic virtual space where users engage in immediate and synchronized conversations. Through this packet, entities may effortlessly communicate though sharing thoughts, ideas, and information in a fluid and instantaneous manner. Participants exchange text messages, emojis, and links, fostering a sense of community while transcending geographical boundaries. This chatroom's architecture allows for the rapid transmission of messages, ensuring that interactions occur in real-time, enabling seamless and responsive dialogue among its users. Whether for social connections, professional collaboration, or shared interests, this chatroom harnesses the power of real-time communication to create a vibrant and engaging platform for diverse conversations and exchanges.

With continued reference to FIG. 1, video streaming and/or a video call may be facilitated between the first entity profile and the second entity profile using a real-time video communication packet. Video streaming through a real-time video communication packet is a process that enables the continuous transmission of video content from a source to multiple viewers in a seamless and synchronized manner. This technology employs data packets that carry video frames, audio, and other necessary information. As a user initiates video streaming, the content is divided into small packets and transmitted over the internet. These packets may be sent in real-time, ensuring minimal delay and allowing viewers to experience the video as it's being received. The recipient's device may reassemble these packets to display the video and play the accompanying audio, creating a smooth, buffer-free viewing experience. Real-time video communication packets may be fundamental in live streaming, online conferencing, and video on demand services, making it possible for audiences to watch content as it happens or at their convenience with high quality and low latency.

With continued reference to FIG. 1, processor 104 may assign the first dynamic data packet 140 to a first event handler 148. As used in the current disclosure, an "event handler" is a programming construct or function that responds to and manages events in software applications. An event handler 148 associated with a dynamic data packet 140 may be a software component or routine that is responsible for detecting, processing, and responding to specific events or actions triggered by the receipt or use of dynamic data packets 140. These event handlers 148 may play a critical role in managing real-time interactions and ensuring that the data within dynamic packets 140 is processed appropriately. Event handlers 148 associated with dynamic data packets 140 are essential for managing real-time interactions and ensuring that data is processed and displayed correctly within applications like chat systems, collaborative tools, and real-time communication platforms. They contribute to the smooth and interactive user experience by handling events triggered by the reception of dynamic data packets.

With continued reference to FIG. 1, the use of an event handler 148 may be triggered by an event. As used in the current disclosure, an "event" is an occurrence or trigger within a software program, often generated by user actions or system processes. An event is a specific occurrence or action within an application that requires a response. Examples of events include button clicks (i.e. right click, left click, scrolls using the wheel, keys on a keyboard, and the like), keyboard input, mouse movements, form submissions, timer expirations, hovering over an icon, and the like. In an embodiment, an event hander 148 may be triggered by the click of a button. These handlers may respond to user clicks on buttons or other interactive elements in a user interface. They can trigger actions like submitting a form, opening a dialog, or navigating to another page. In an embodiment, an event hander 148 may be triggered by a mouse event. Mouse event handlers may respond to mouse actions, including clicks, hover, and drag-and-drop interactions. They may be used to manage user interactions with graphical elements. In additional embodiment, an event handler 148 may include a scroll event handler. Scroll event handlers respond to scrolling actions, typically used for implementing parallax effects, lazy loading of content, or infinite scrolling in web applications. In some cases, event handlers 148 may include drag and drop event handlers. Drag and drop event handlers may respond to users dragging elements and dropping them in designated areas. They are used for implementing features like file uploads or rearranging items in a list. In some cases, event handlers 148 may include custom event handlers. Custom event handlers allow developers to define and respond to custom events that are specific to the needs of their application. These events are not part of standard browser or system events. Event handlers 148 may be responsible for defining how an application should respond when a specific event occurs. In an embodiment, an event handler 148 may trigger the connection between two or more entity profiles via video conference, audio calls, real-time text-based communication, and the like. An event handler 148 may additionally trigger actions on a user interface such as scrolling through a social media timeline and interactions with posts. Event handlers 148 may be used in conjunction with graphical user interfaces (GUIs), display devices, web applications, and other software systems to enable interactivity and responsiveness.

With continued reference to FIG. 1, an event handler 148 may be associated with an event listener, which may be responsible for detecting and capturing events as they occur. The event listener may "listen" for the occurrence of specific events. The core of an event handler 148 may be a callback function. This function may be executed when the associated event is triggered. It contains the instructions or code that define how the application should respond to the event. Event handlers 148 are typically bound or attached to specific elements or components within the application. For example, a button click event handler is bound to a particular button widget. The process of associating an event handler 148 with an event is known as event registration. This is where the application specifies which event should trigger the associated callback function. Event handlers 148 can accept parameters, often including event objects that provide information about the event, such as the type of event, target element, and event-specific data. These parameters allow the event handler to access relevant information. The primary purpose of an event handler 148 is to define the action or response to be taken when the event occurs. This could involve updating the user interface, processing data, making network requests, or any other application-specific task. In some cases, events can propagate or "bubble up" through the application's hierarchy of elements. Event handlers can control whether an event continues to propagate or stops at a specific point in the element hierarchy.

With continued reference to FIG. 1, processor 104 may display the first dynamic data packet 140 using a dynamic content transmitter 152. As used in the current, a "dynamic content transmitter" is a software or system component responsible for delivering dynamic or real-time content to users, often over a network or through an application interface. It plays a crucial role in ensuring that users receive up-to-date and relevant information, such as text, images, videos, notifications, or other data that can change frequently. Dynamic content transmitters 152 may generate or retrieve content from various sources, which can include databases, APIs, external services, or user-generated data. The content may be textual, visual, interactive, or multimedia in nature. Dynamic content transmitters 152 may deliver content that is updated in real-time or at specific intervals, allowing users to access the most current information available. Dynamic content transmitters 152 may synchronize data across various platforms or devices, ensuring that users see consistent information, regardless of where or how they access it. Dynamic content transmitters 152 often operate in responses to specific events or triggers, such as user interactions, data updates, sensor readings, or external system events. Dynamic content transmitters may deliver personalized content tailored to individual user preferences, behavior, or demographics, enhancing the user experience. To improve performance and reduce load on servers, content transmitters may employ caching mechanisms to store frequently accessed content for quick retrieval. In cases involving multimedia content, dynamic content transmitters 152 may support media streaming, allowing users to watch videos or listen to audio in real-time without having to download the entire file. This may include enabling interactive features, such as chat, comments, likes, and sharing, to foster user engagement and collaboration around dynamic content. IN some embodiments, Dynamic content transmitters ensure that content is formatted and optimized for display on various devices and screen sizes, including computers, smartphones, tablets, smart TVs, and the like. To protect sensitive data, they may implement security measures, including encryption, access controls, and user authentication, depending on the nature of the content.

Still referring to FIG. 1, processor 104 may be configured to display the dynamic data packet 140 using a dynamic content transmitter 152 on a display device 156. As used in the current disclosure, a "display device" is a device that is used to display content. A display device 156 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

With continued reference to FIG. 1, processor 104 may be configured to place the dynamic data packet 140 through an encryption process. In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from a lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful time-frame may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running a lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatán hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

With continued reference to FIG. 1, Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

With continued reference to FIG. 1, Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 1, Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Figure 2:
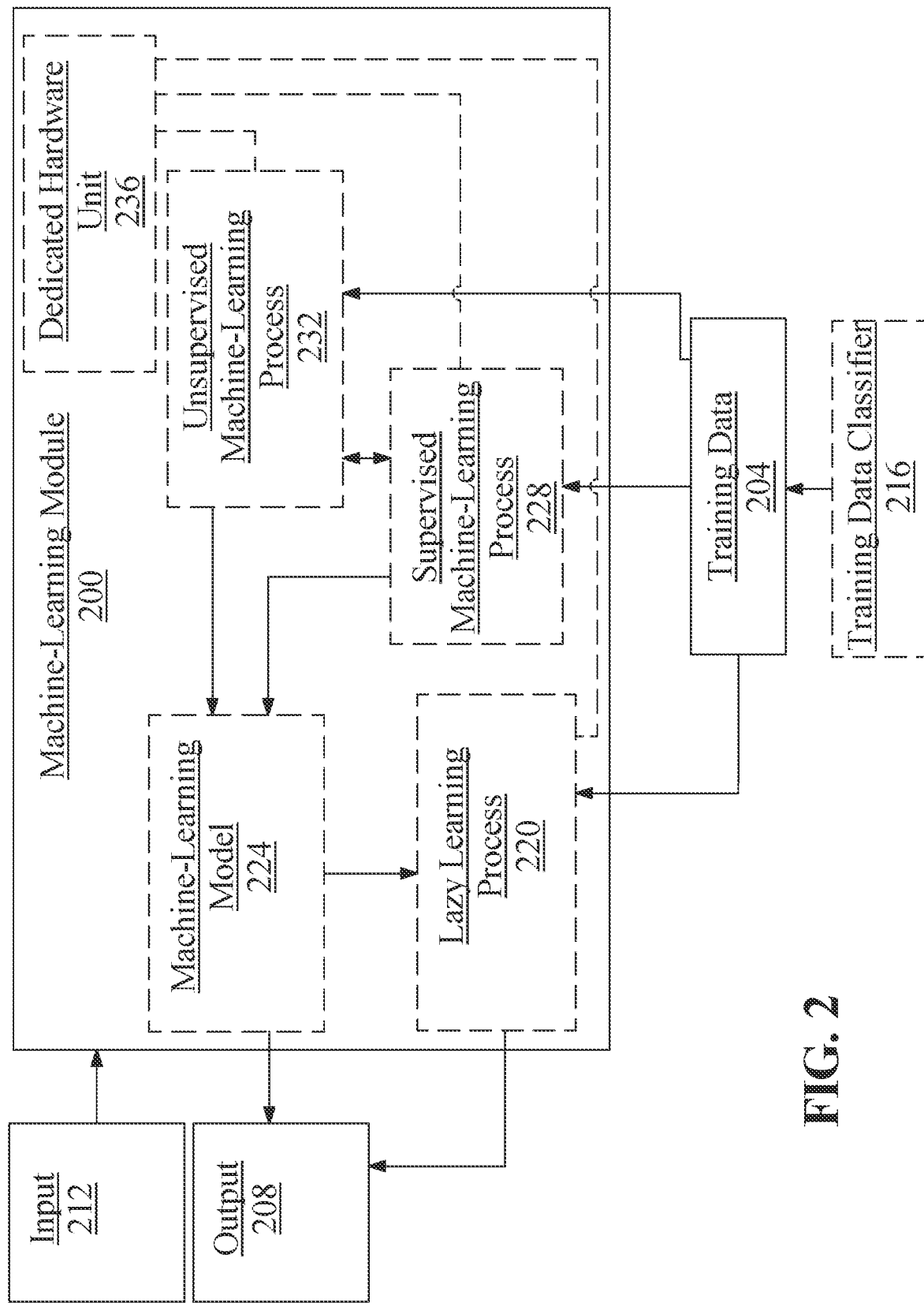
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example a plurality of attribute data 112 as inputs correlated to examples of pairings of entity profiles as outputs.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to sort entity profiles based upon their financial data and/or their target groups.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include plurality of attribute data 112 as described above as inputs, pairings of entity profiles as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
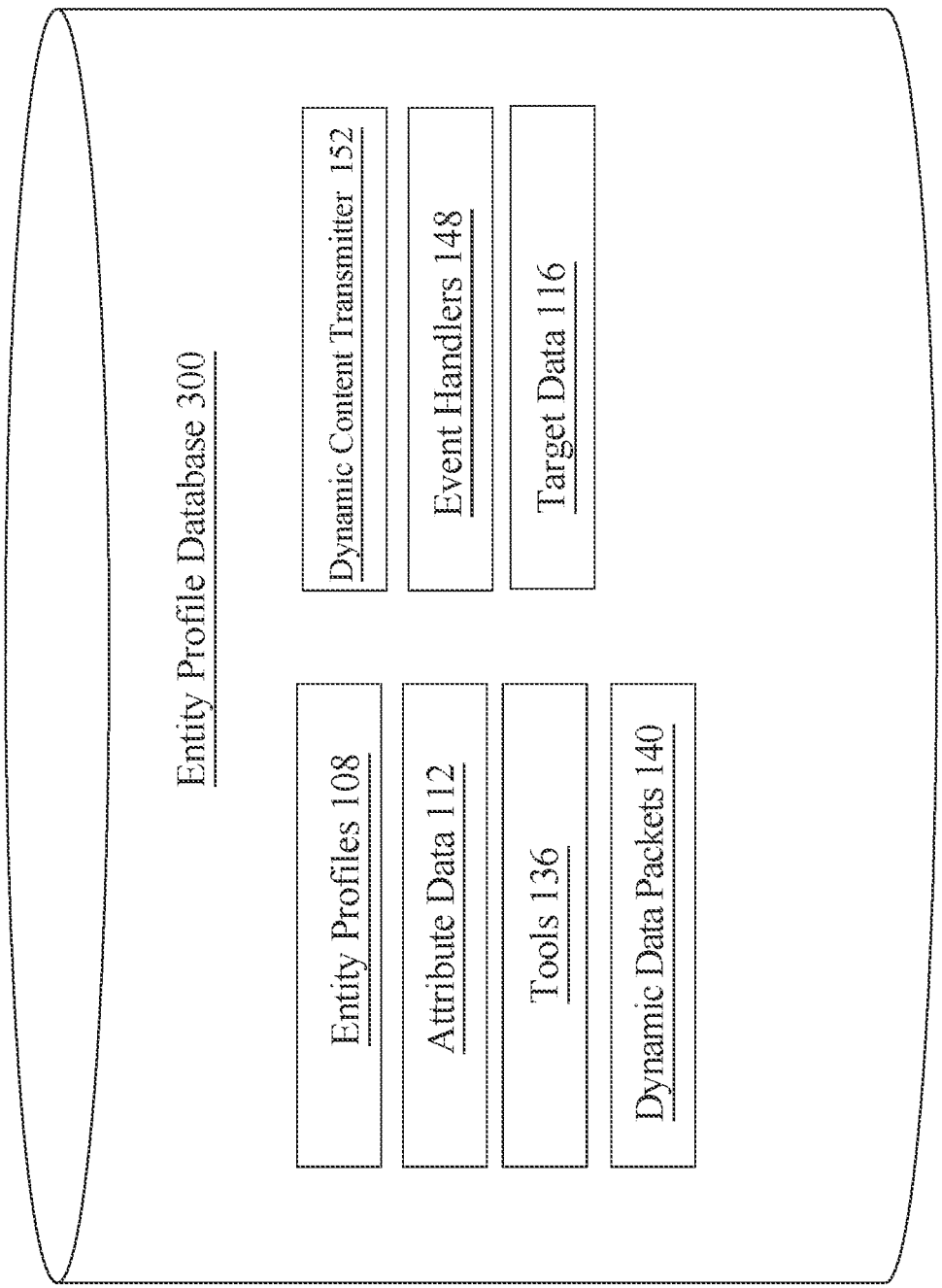
FIG. 3 is a block diagram of an exemplary embodiment of an entity profile database.

Now referring to FIG. 3, an exemplary entity profile database 300 is illustrated by way of block diagram. In an embodiment, any past or present versions of any data disclosed herein may be stored within the entity profile database 300 including but not limited to: entity profiles 108, mentorship collaboration criteria, resource collaboration criteria, attribute data 112, target group, financial data, tools 136, assignments of two or more tools 136, pairing of entity profiles, dynamic data packets 140, event handlers 148, dynamic content transmitters 152, and the like. Processor 104 may be communicatively connected with entity profile database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. Entity profile database 300 may be implemented, without limitation, as a relational database, a key-value retrieval database such as a NOSQL database, or any other format or structure for use as a database that a person skilled in the art would recognize as suitable upon review of the entirety of this disclosure. Entity profile database 300 may alternatively or additionally be implemented using a distributed data storage protocol and/or data structure, such as a distributed hash table or the like. Entity profile database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
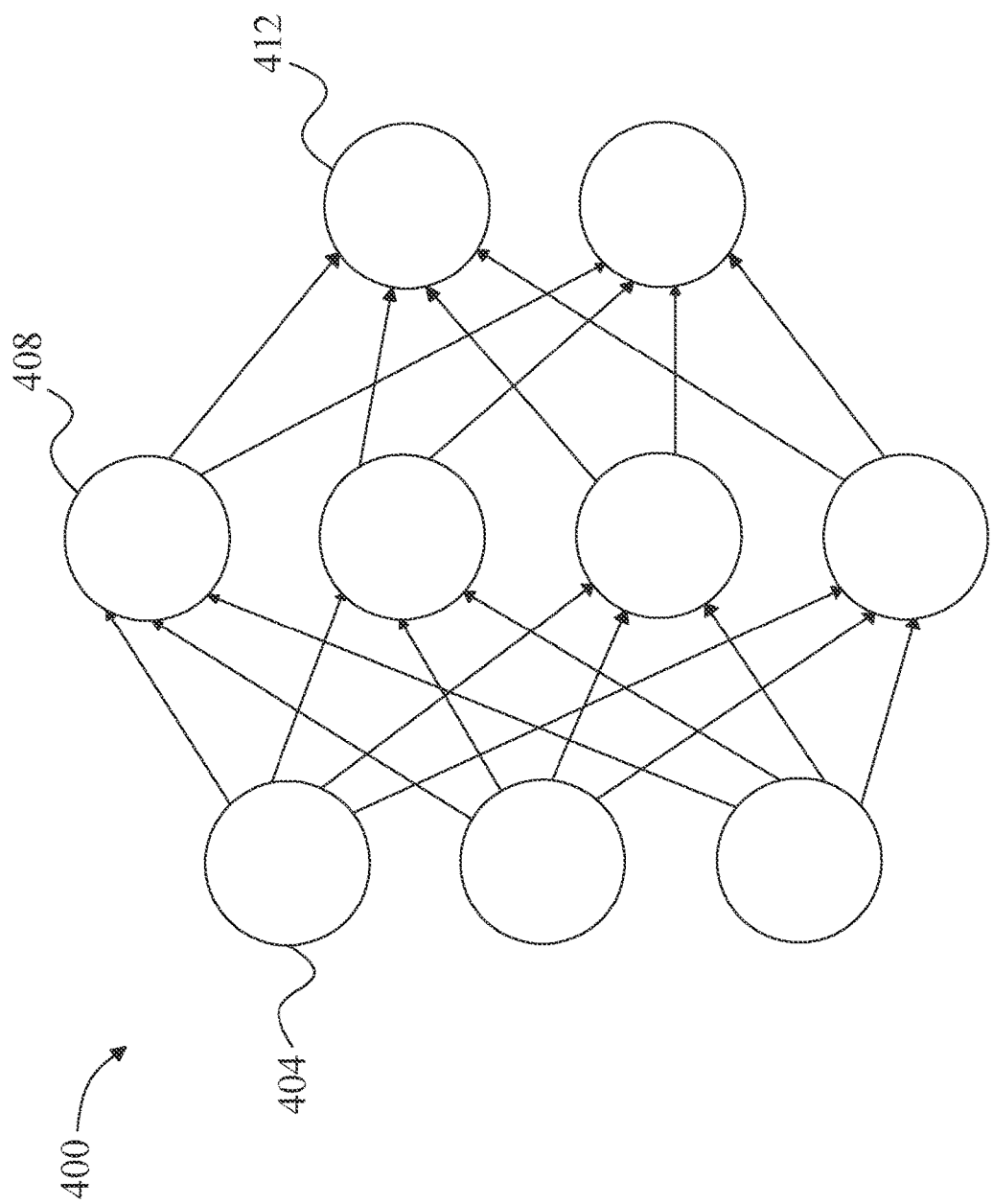
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
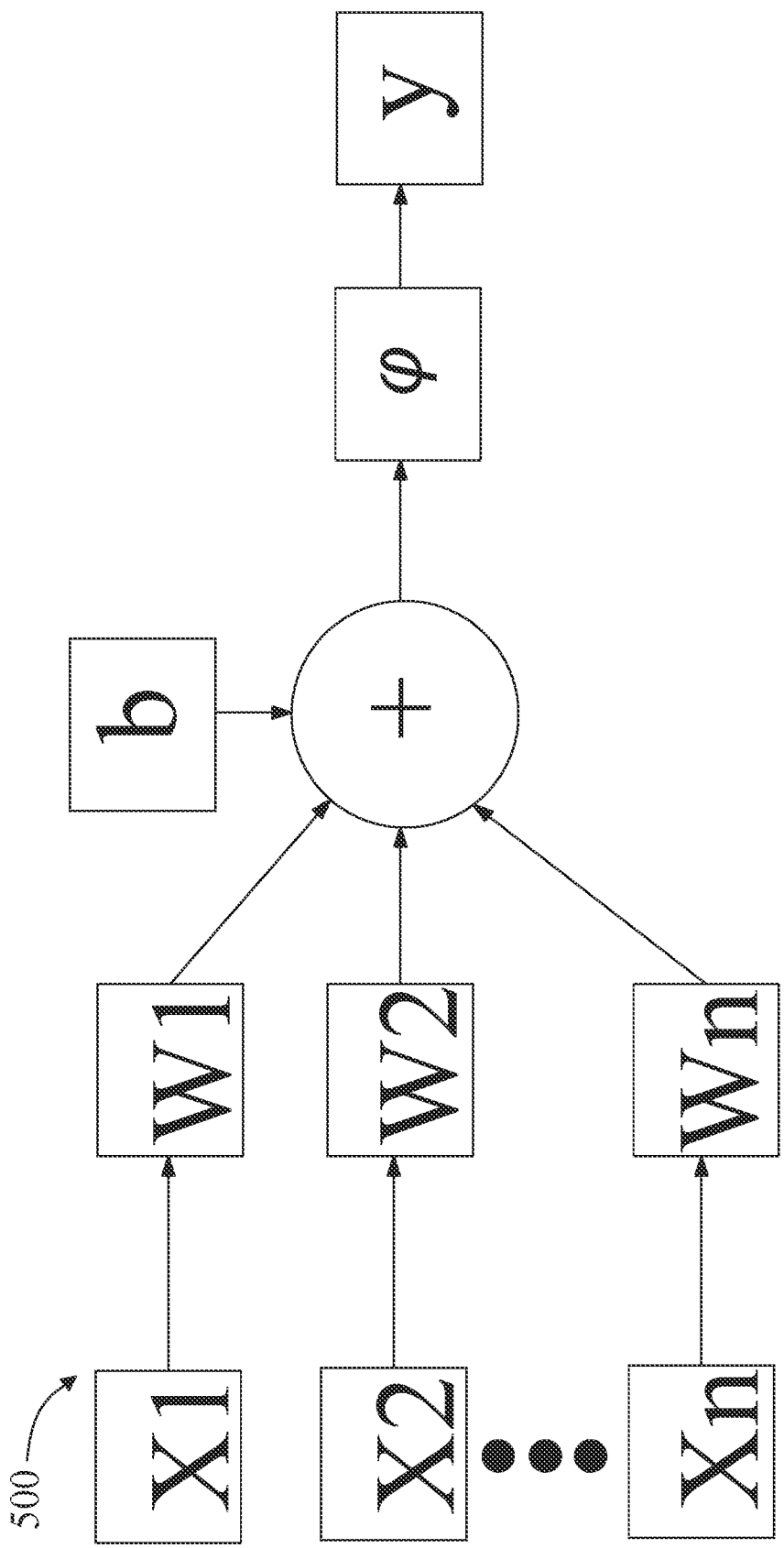
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
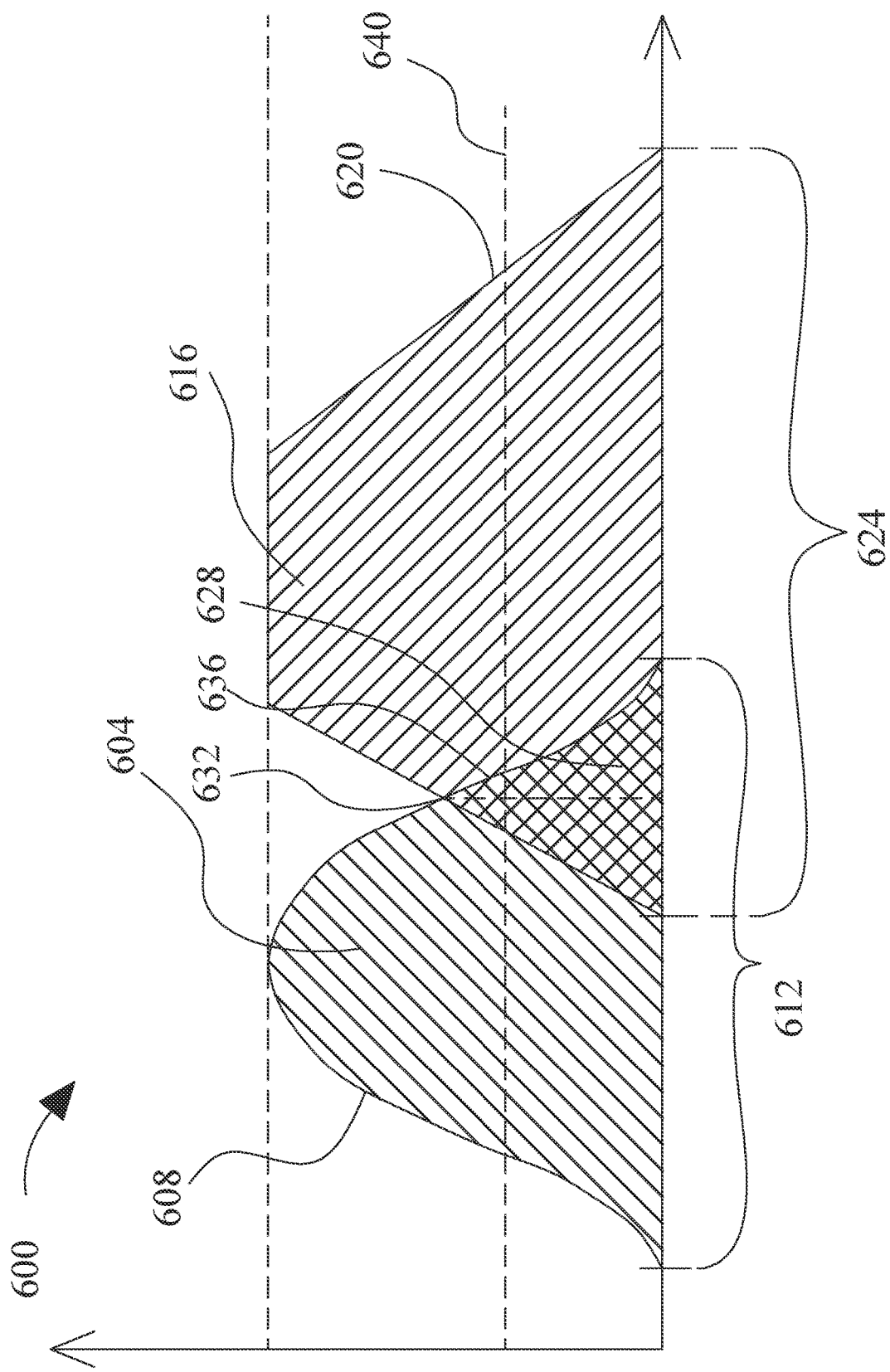
FIG. 6 is an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent a first entity profile 124 and a second entity profile 128 from FIG. 1.

Alternatively or additionally, and still referring to FIG. 6, fuzzy set comparison 600 may be generated as a function of determining the data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input first entity profile 124 and second entity profile 128. For instance, an acceptance variable may represent a first measurable value pertaining to the classification of first entity profile 124 to second entity profile 128. Continuing the example, an output variable may represent a pairing of the first entity profile 124 and the second entity profile 128. In an embodiment, first entity profile 124 and/or second entity profile 128 may be represented by their own fuzzy set. In other embodiments, the classification of the data into a pairing of the first entity profile 124 and the second entity profile 128 may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any first entity profile 124 and second entity profile 128. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, the classification into one or more query categories may indicate a sufficient degree of overlap with fuzzy set representing first entity profile 124 and second entity profile 128 for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both first entity profile 124 and second entity profile 128 have fuzzy sets, a pairing of the first entity profile 124 and the second entity profile 128 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
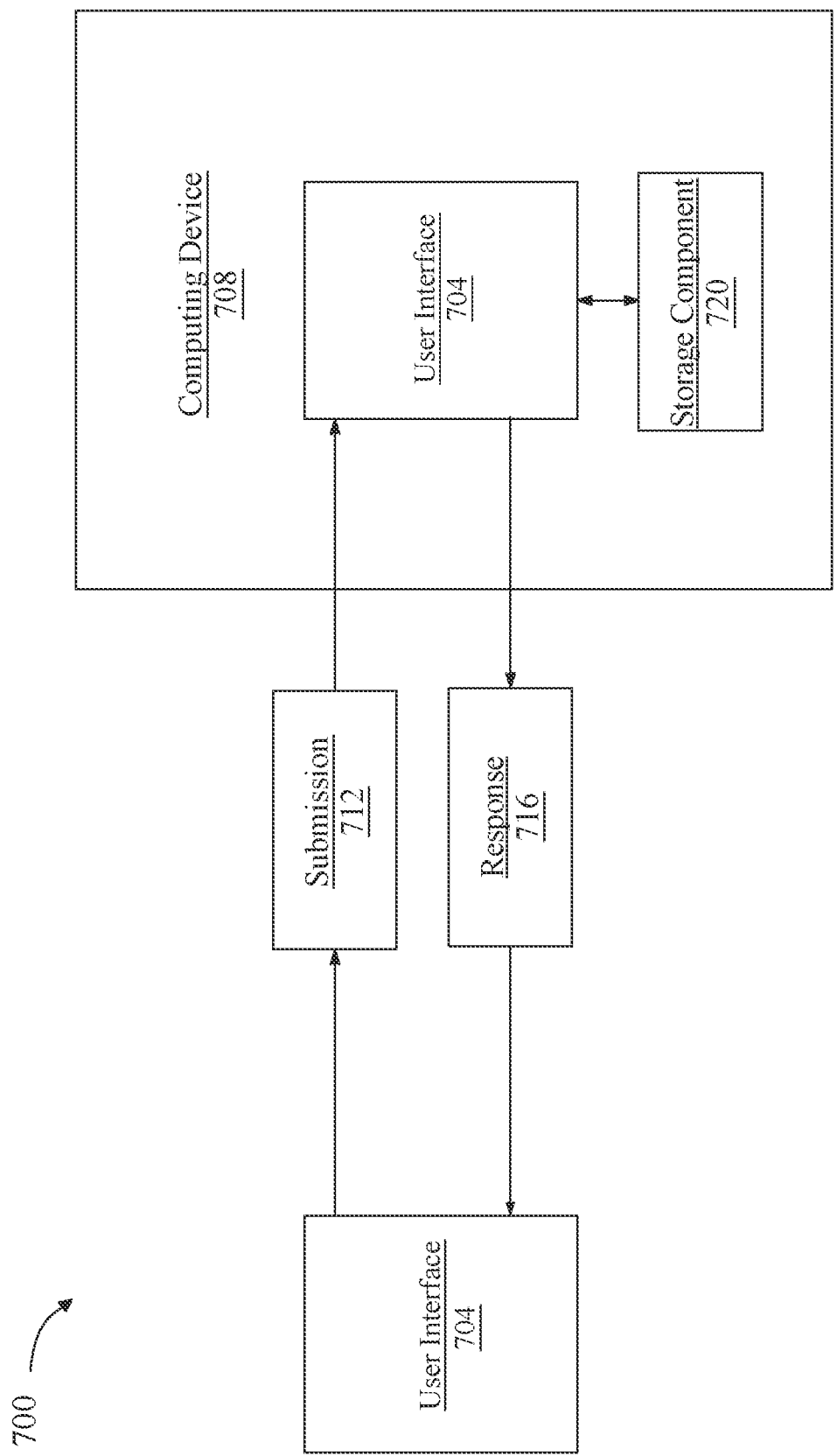
FIG. 7 is an illustration of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 716, from the chatbot to the user interface 704. In many cases, one or both of submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor. In some embodiments, processor processes a submission 712 using one or more of keyword recognition, pattern matching, and natural language processing. In some embodiments, processor employs real-time learning with evolutionary algorithms. In some cases, processor may retrieve a pre-prepared response from at least a storage component 720, based upon submission 712. Alternatively or additionally, in some embodiments, processor communicates a response 716 without first receiving a submission 712, thereby initiating conversation. In some cases, processor communicates an inquiry to user interface 704; and the processor is configured to process an answer to the inquiry in a following submission 712 from the user interface 704. In some cases, an answer to an inquiry present within a submission 712 from a user device 704 may be used by computing device 708 as an input to another function.

With continued reference to FIG. 7, A chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "Chatbot input" is any response that a candidate or employer inputs in to a chatbot as a response to a prompt or question.

With continuing reference to FIG. 7, computing device 708 may be configured to the respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 708 may generate two or more decision trees, which may overlap; for instance, a root node of one tree may connect to and/or receive output from one or more terminal nodes of another tree, intermediate nodes of one tree may be shared with another tree, or the like.

Still referring to FIG. 7, computing device 708 may build decision tree by following relational identification; for example, relational indication may specify that a first rule module receives an input from at least a second rule module and generates an output to at least a third rule module, and so forth, which may indicate to computing device 708 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 708 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 7, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 8:
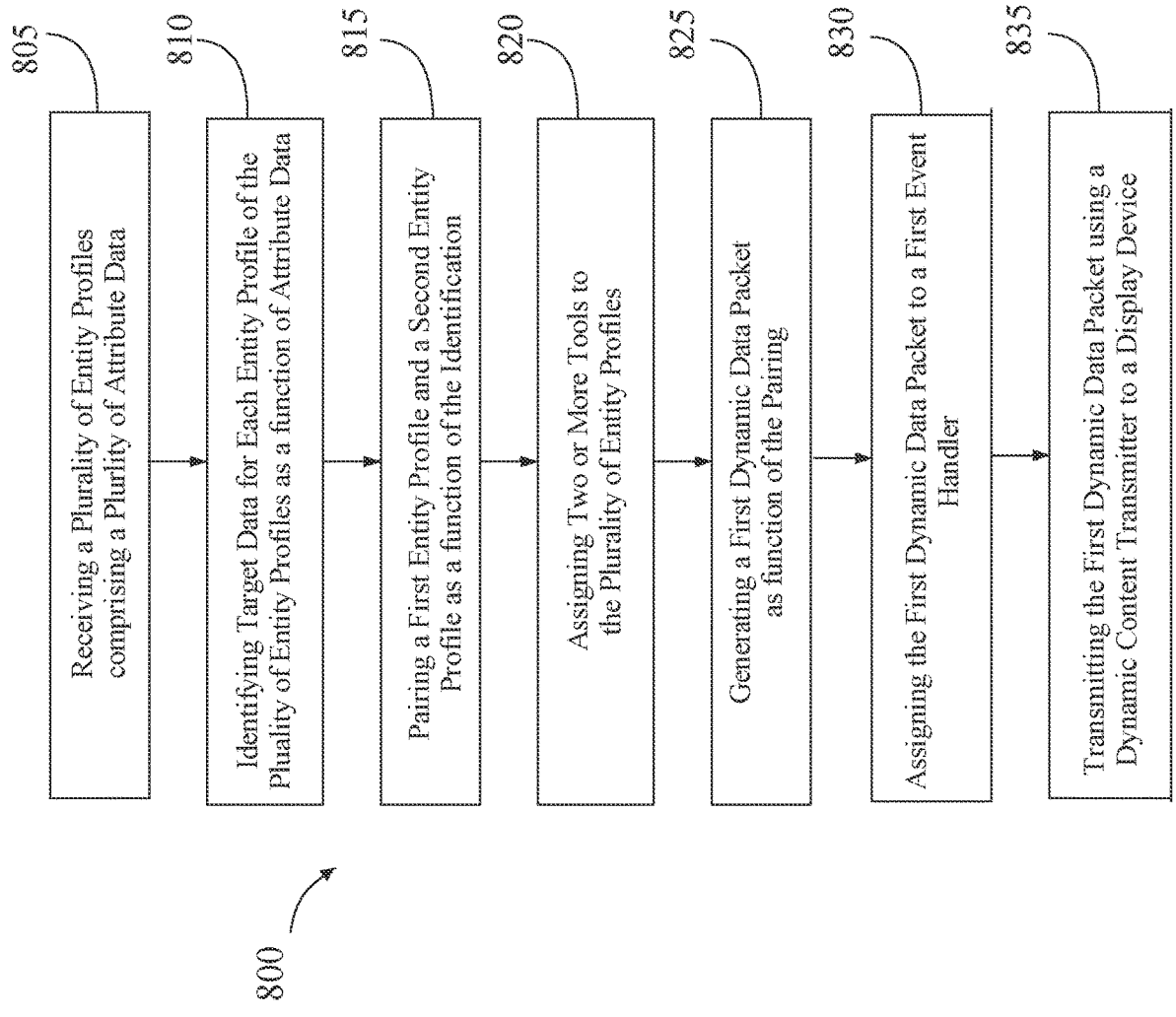
FIG. 8 is a flow diagram of an exemplary method for the generation of dynamic data packets.

Referring now to FIG. 8, a flow diagram of an exemplary method 800 for the generation of dynamic data packets is illustrated. At step 805, method 800 includes receiving, using at least a processor, a plurality of entity profiles comprising a plurality of attribute data. This may be implemented as described and with reference to FIGS. 1-7.

Still referring to FIG. 8, at step 815, method 800 includes identifying, using the at least a processor, target data for each entity profile of the plurality of entity profiles as function of the attribute data. This may be implemented as described and with reference to FIGS. 1-7.

Still referring to FIG. 8, at step 815, method 800 includes pairing, using the at least a processor, a first entity profile and a second entity profile of the plurality of entity profiles as a function of the assignment. Pairing the first entity profile and the second entity profile includes iteratively training a entity profile machine-learning model using profile training data, wherein the profile training data comprises the plurality of attribute data as inputs correlated to examples of pairings of entity profiles and pairing the entity profile and the second entity profile using the trained entity profile machine-learning model. This may be implemented as described and with reference to FIGS. 1-7. In an embodiment, pairing the first entity profile and the second entity profile may include pairing the first entity profile and the second entity profile as a function of a mentorship collaboration criteria and/or a resource collaboration criteria.

Still referring to FIG. 8, at step 820, method 800 includes assigning, using the at least a processor, two or more tools to the plurality of entity profiles as a function of the attribute data. This may be implemented as described and with reference to FIGS. 1-7. In an embodiment, at least one of the two or more tools may include a goal setting tool, time management tool, and/or a resource management tool.

Still referring to FIG. 8, at step 825, method 800 includes generating, using the at least a processor, a first dynamic data packet as function of the pairing of the entity profile and the second entity profile. This may be implemented as described and with reference to FIGS. 1-7. In an embodiment, the first dynamic data packet may include a real-time video communication packet, real-time text-based communication packet, and/or timeline data packet. In an additional embodiment, the method may further include placing, using the at least a processor, the first dynamic data packet through an encryption process.

Still referring to FIG. 8, at step 830, method 800 includes assigning, using the at least a processor, the first dynamic data packet to a first event handler. This may be implemented as described and with reference to FIGS. 1-7.

Still referring to FIG. 8, at step 835, method 800 includes displaying the first dynamic data packet using a dynamic content transmitter on a display device. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
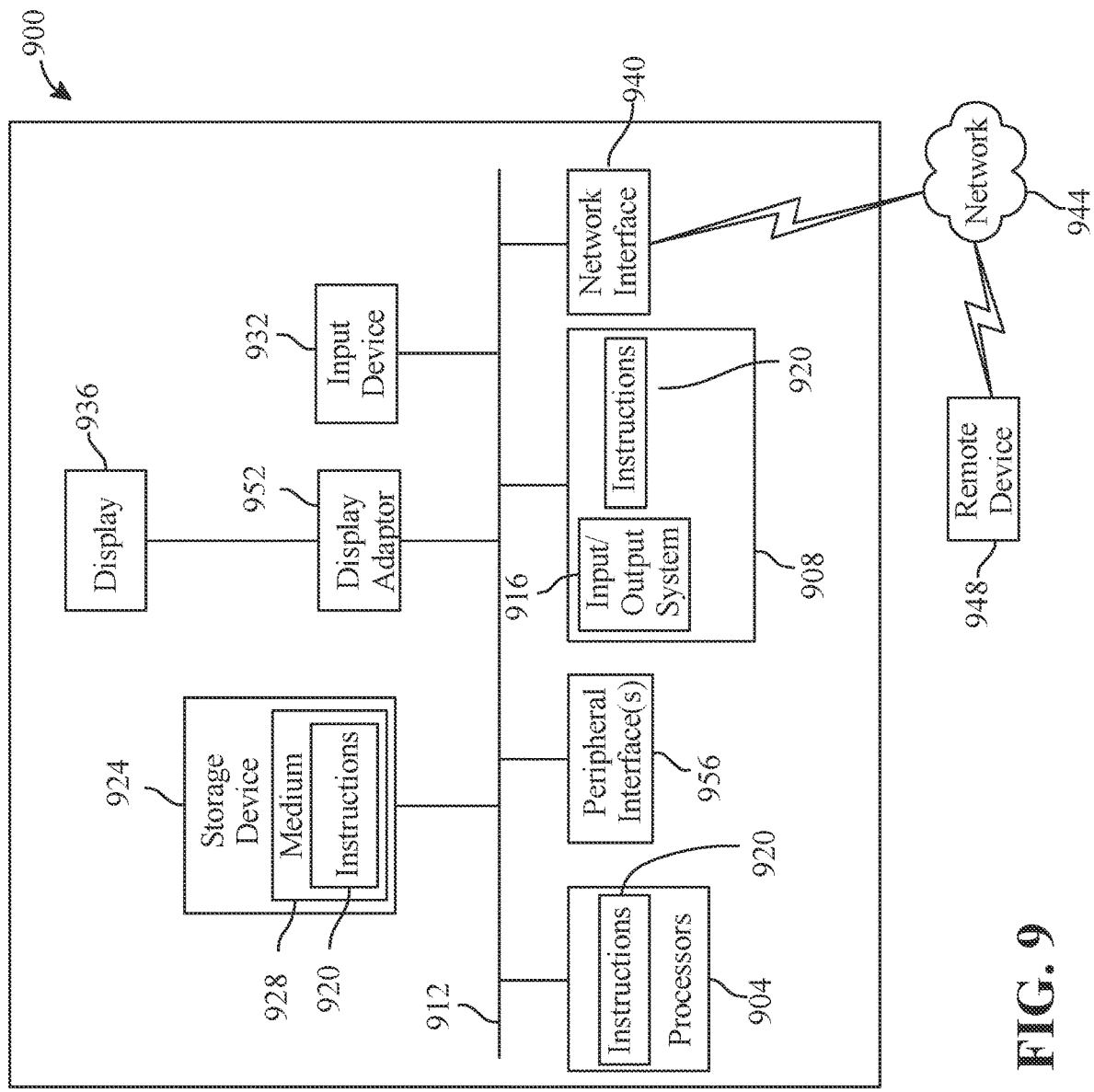
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for the generation of dynamic data packets, wherein the apparatus comprises:
   at least a processor; and
   a memory communicatively connected to the at least a processor, wherein the memory containing instructions configuring the at least a processor to:
      receive a plurality of entity profiles comprising a plurality of attribute data;
      identify target data for each entity profile of the plurality of entity profiles as function of the attribute data;
      pair a first entity profile and a second entity profile of the plurality of entity profiles as a function of the target data, wherein pairing the first entity profile and the second entity profile comprises:
         iteratively training an entity profile machine-learning model using entity profile training data, wherein the entity profile training data comprises a plurality of target data and entity profiles as inputs correlated to examples of pairings of entity profiles as outputs; and
         pairing the first entity profile and the second entity profile using the trained entity profile machine-learning model;
      assign two or more tools to the first entity profile and the second entity profile as a function of the target data;
      generate a first dynamic data packet as function of the pairing of the entity profile and the second entity profile;
      assign the first dynamic data packet to a first event handler; and
      transmit the first dynamic data packet using a dynamic content transmitter to a display device.

2. The apparatus of claim 1, wherein the memory further instructs the processor to facilitate a chatroom between the first entity profile and the second entity profile as function of a real-time text-based communication packet.

3. The apparatus of claim 1, wherein the memory further instructs the processor to facilitate a video call between the first entity profile and the second entity profile as function of a real-time video communication packet.

4. The apparatus of claim 1, wherein identifying target data for each entity profile of the plurality of entity profiles further comprises identifying a performance metric for each profile of the plurality of entity profiles, wherein the performance metric comprises a time component associated with a target.

5. The apparatus of claim 1, wherein the memory further instructions the processor to encrypt the first dynamic data packet using an encryption process.

6. The apparatus of claim 1, wherein at least one of the two or more tools comprises a goal setting tool.

7. The apparatus of claim 1, wherein at least one of the two or more tools comprises a time management tool.

8. The apparatus of claim 1, wherein at least one of the two or more tools comprises a resource management tool.

9. The apparatus of claim 1, wherein paring the first entity profile and the second entity profile comprises paring the first entity profile and the second entity profile as a function of a mentorship collaboration criteria.

10. The apparatus of claim 1, wherein paring the first entity profile and the second entity profile comprises paring the first entity profile and the second entity profile as a function of a resource collaboration criteria.

11. A method for the generation of dynamic data packets, wherein the method comprises:
   receiving, using at least a processor, a plurality of entity profiles comprising a plurality of attribute data;
   identifying, using the at least a processor, target data for each entity profile of the plurality of entity profiles as function of the attribute data;
   pairing, using the at least a processor, a first entity profile and a second entity profile of the plurality of entity profiles as a function of the target data, wherein pairing the first entity profile and the second entity profile comprises:
      iteratively training an entity profile machine-learning model using entity profile training data, wherein the entity profile training data comprises a plurality of target data and entity profiles as inputs correlated to examples of pairings of entity profiles as outputs; and
      pairing the first entity profile and the second entity profile using the trained entity profile machine-learning model;
   assigning, using the at least a processor, two or more tools to the first entity profile and the second entity profile as a function of the target data;
   generating, using the at least a processor, a first dynamic data packet as function of the pairing of the entity profile and the second entity profile;
   assigning, using the at least a processor, the first dynamic data packet to a first event handler; and
   transmitting, using the at least a processor, the first dynamic data packet using a dynamic content transmitter to a display device.

12. The method of claim 11, wherein the method further comprises facilitating, using the at least a processor, a chatroom between the first entity profile and the second entity profile as function of a real-time text-based communication packet.

13. The method of claim 11, wherein the method further comprises facilitating, using the at least a processor, a video call between the first entity profile and the second entity profile as function of a real-time video communication packet.

14. The method of claim 11, wherein identifying target data for each entity profile of the plurality of entity profiles further comprises identifying a performance metric for each profile of the plurality of entity profiles, wherein the performance metric comprises a time component associated with a target.

15. The method of claim 11, wherein the method further comprises encrypting, using the at least a processor, the first dynamic data packet using an encryption process.

16. The method of claim 11, wherein at least one of the two or more tools comprises a goal setting tool.

17. The method of claim 11, wherein at least one of the two or more tools comprises a time management tool.

18. The method of claim 11, wherein at least one of the two or more tools comprises a resource management tool.

19. The method of claim 11, wherein pairing the first entity profile and the second entity profile comprises pairing the first entity profile and the second entity profile as a function of a mentorship collaboration criteria.

20. The method of claim 11, wherein pairing the first entity profile and the second entity profile comprises pairing the first entity profile and the second entity profile as a function of a resource collaboration criteria.

* * * * *